(12) United States Patent
Taketani et al.

(10) Patent No.: US 7,106,575 B2
(45) Date of Patent: Sep. 12, 2006

(54) SOLID ELECTROLYTIC CAPACITOR

(75) Inventors: Yutaka Taketani, Daito (JP); Yoshiaki Hasaba, Shijonawate (JP); Makoto Sakamaki, Daito (JP); Tadahito Ito, Neyagawa (JP)

(73) Assignees: Sanyo Electric Co., Ltd., Moriguchi (JP); Sun Electronic Industries Corp., Shijonawate (JP)

( * ) Notice: Subject to any disclaimer, the term of this patent is extended or adjusted under 35 U.S.C. 154(b) by 0 days.

(21) Appl. No.: 11/205,115

(22) Filed: Aug. 17, 2005

(65) Prior Publication Data
US 2006/0044736 A1 Mar. 2, 2006

(30) Foreign Application Priority Data
Aug. 26, 2004 (JP) ............................. 2004-247332
Aug. 26, 2004 (JP) ............................. 2004-247333

(51) Int. Cl.
*H01G 9/04* (2006.01)
*H01G 9/145* (2006.01)
(52) U.S. Cl. ...................................... 361/528; 361/532
(58) Field of Classification Search ................ 361/523, 361/525–530, 532, 535
See application file for complete search history.

(56) References Cited

U.S. PATENT DOCUMENTS 4,590,541 A * 5/1986 Takahashi et al. .......... 361/527
4,858,078 A * 8/1989 Morimoto et al. .......... 361/527
6,522,527 B1 * 2/2003 Kojima et al. .............. 361/523

FOREIGN PATENT DOCUMENTS

| JP | 64-13714 | * | 1/1989 |
| JP | 10-64761 | | 3/1998 |
| JP | 10-64763 | * | 3/1998 |
| JP | 2001284178 A | * | 10/2001 |

OTHER PUBLICATIONS

K. Yoshida, et al.; "Development of Niobium solid electrolytic capacitors;" *Capacitor Technology, The Electrochemical Society of Japan*; vol. 9; No. 1; 2002, Cover page and pp. 1-5 and Partial Translation (9 Sheets total.)/Discussed in the specification.

* cited by examiner

*Primary Examiner*—Eric W. Thomas
(74) *Attorney, Agent, or Firm*—Armstrong, Kratz, Quintos, Hanson & Brooks, LLP

(57) ABSTRACT

A solid electrolytic capacitor has a capacitor element formed by successively forming a dielectric coating, a solid electrolyte layer and a cathode extraction layer on a surface of an anode body, and is characterized in that the capacitor element includes at least one of a polyhydroxy saturated hydrocarbon and phytic acid. With this, a solid electrolytic capacitor can be provided which allows restoring of thermal degradation of a dielectric coating to a practical level.

10 Claims, 1 Drawing Sheet

SOLID ELECTROLYTIC CAPACITOR

BACKGROUND OF THE INVENTION

1. Field of the Invention

Figure 1:
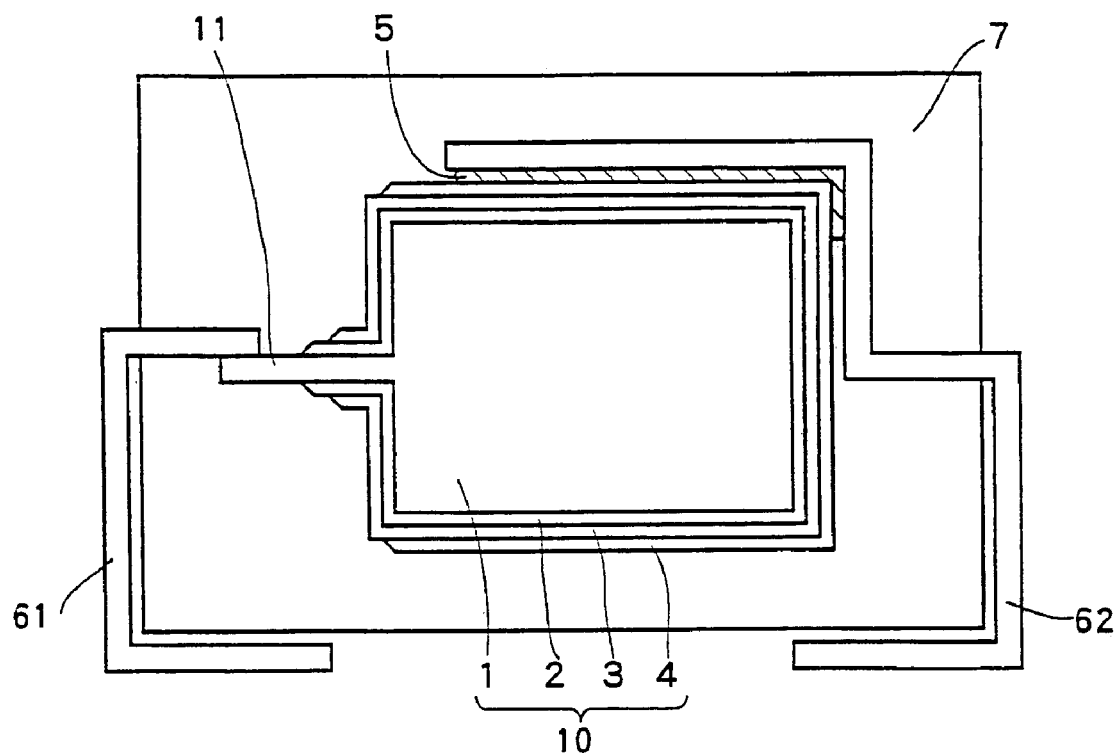

The present invention relates to a solid electrolytic capacitor including an anode body having a dielectric coating, a solid electrolyte layer and a cathode extraction layer successively formed thereon.

2. Description of the Related Art

At present, a rolled body of roughened aluminum foil, a monolayer or multilayer body of a roughened aluminum sheet, or a porous sintered body of tantalum powder, for example, is frequently used as an anode body of a solid electrolytic capacitor.

Niobium is also receiving attention as a material of the anode body. Niobium is a metal belonging to the same 5A group of the periodic system as tantalum and having a physical property similar to tantalum. Because niobium has many advantages as compared to tantalum such as a smaller specific gravity, larger reserves and a lower price per kg, attempts have been made to utilize niobium as an anode material of an electrolytic capacitor.

A conventional solid electrolytic capacitor has a structure such that, as shown in FIG. 1, on a surface of an anode body 1 formed with a valve action metal such as tantalum, aluminum or niobium, a dielectric coating 2 formed by oxidization of the anode body 1, a solid electrolyte layer 3 formed with a conductive inorganic material such as manganese dioxide or a conductive organic material such as a TCNQ (7,7,8,8-tetracyanoquinodimethane, which is the same in the following) complex salt or a conductive polymer, and a cathode extraction layer 4 formed with conductive carbon, silver or the like are successively formed to construct a capacitor element 10, an anode terminal 61 is connected by resistance welding or the like to an anode lead member 11 inserted into the anode body from one end surface thereof, a cathode terminal 62 is connected to cathode extraction layer 4 using a conductive adhesive 5, and capacitor element 10 is covered and sealed with an exterior resin 7 such as an epoxy resin formed by injection molding or the like (see, for example, Japanese Patent Laying-Open No. 10-064761 (in particular, page 2 and FIG. 1)).

In the solid electrolytic capacitor described above, formation of the exterior resin using a highly durable hard epoxy resin and application of a heat load of a high temperature for lead-free solder degrade insulation of the dielectric coating and increase an LC (Leaked Current, which is the same in the following) value.

In particular, it is repeatedly reported in conferences that such increase in the LC due to the heat load or the like is much larger in a solid electrolytic capacitor using an anode body including niobium as a main component as compared with that using tantalum in the anode body. In the solid electrolytic capacitor using the anode body including niobium as a main component, the dielectric coating is nearly short-circuited due to the heat load or the like, and the LC value is increased so much that it cannot be restored by aging (gradually decreasing the LC with a voltage load, which is the same in the following). A main cause thereof is reported to be diffusion of a portion of oxygen atoms of the dielectric coating ($Nb_2O_5$) among niobium (Nb) of a base side and resulting lack of oxygen in the dielectric when excessive heat is applied to the capacitor element, which is a phenomenon unique to niobium (for example, see the Electrochemical Society of Japan, "Capacitor Technology" Vol. 9, No. 1, 2002, p. 2).

A conceivable method for restoring the dielectric coating may be to supply lacked oxygen or to convert a portion of the solid electrolyte contacting a defective portion locally into a nonconductive form. It is difficult, however, to supply oxygen to the solid electrolyte not containing water, and localized conversion of the solid electrolyte, especially the conductive polymer, into a nonconductive form cannot be performed in a short time.

SUMMARY OF THE INVENTION

In view of the above-described problems, an object of the present invention is to provide a solid electrolytic capacitor which allows restoring of thermal degradation of a dielectric coating to a practical level.

According to an aspect of the present invention, a solid electrolytic capacitor has a capacitor element formed by successively forming a dielectric coating, a solid electrolyte layer and a cathode extraction layer on a surface of an anode body, and the capacitor element further includes a polyhydroxy saturated hydrocarbon. In the solid electrolytic capacitor in this aspect, the anode body can include niobium as a main component, and the polyhydroxy saturated hydrocarbon can include at least one member selected from the group consisting of a polyhydroxy aldehyde, a polyhydroxy ketone, a polyhydroxy alcohol, a polyhydroxy ether, a polyhydroxy acid and a salt thereof, and homologues, derivatives and polymers thereof.

According to another aspect of the present invention, a solid electrolytic capacitor has a capacitor element formed by successively forming a dielectric coating, a solid electrolyte layer and a cathode extraction layer on a surface of an anode body, and the capacitor element further includes phytic acid. In the solid electrolytic capacitor in this aspect, the anode body can include niobium as a main component.

According to a further aspect of the present invention, a solid electrolytic capacitor has a capacitor element formed by successively forming a dielectric coating, a solid electrolyte layer and a cathode extraction layer on a surface of an anode body, and the capacitor element further includes a polyhydroxy saturated hydrocarbon and phytic acid. In the solid electrolytic capacitor in this aspect, the anode body can include niobium as a main component, and the polyhydroxy saturated hydrocarbon can include at least one member selected from the group consisting of a polyhydroxy aldehyde, a polyhydroxy ketone, a polyhydroxy alcohol, a polyhydroxy ether, a polyhydroxy acid and a salt thereof, and homologues, derivatives and polymers thereof.

With the present invention, an LC value worsened by a heat load can be improved. In addition, in the solid electrolytic capacitor using the anode body including niobium as a main component, a markedly worsened LC value can be restored to a desirable value and the solid electrolytic capacitor of a practical level can be provided.

The foregoing and other objects, features, aspects and advantages of the present invention will become more apparent from the following detailed description of the present invention when taken in conjunction with the accompanying drawing.

BRIEF DESCRIPTION OF TIE DRAWING

FIG. 1 is a schematic vertical section of a solid electrolytic capacitor.

DESCRIPTION OF THE PREFERRED EMBODIMENTS

Referring to FIG. 1, a solid electrolytic capacitor according to the present invention has a capacitor element 10 formed by successively forming a dielectric coating 2, a solid electrolyte layer 3 and a cathode extraction layer 4 on a surface of an anode body 1, and the capacitor element 10 further includes at least one of a polyhydroxy saturated hydrocarbon and phytic acid. A saturated hydrocarbon used herein means an organic compound in which all of carbon-carbon bonds are single bonds.

A valve action metal such as tantalum, aluminum, titanium, or niobium can be used as a material of the anode body. Among these, it is preferable to use the anode body including niobium as a main component. The "anode body including niobium as a main component" used herein means that the anode body is formed with niobium itself, or it includes niobium with a certain kind of a foreign metal added thereto or a niobium nitride or oxide.

The polyhydroxy saturated hydrocarbon used in the present invention preferably includes at least one member selected from the group consisting of (1) a polyhydroxy aldehyde such as glucose, mannose, galactose, lactose, or xylose, (2) a polyhydroxy ketone such as dihydroxyacetone or fructose, (3) a polyhydroxy alcohol such as sorbitol, mannitol, erythritol, xylitol, lactitol, or sucrol, and (4) a polyhydroxy ether such as benzylglucopyranose or methylglucose, and homologues, derivatives and polymers thereof.

Referring to FIG. 1, a polyhydroxy saturated hydrocarbon and/or phytic acid can be efficiently added after formation of solid electrolyte layer 3 or before formation of an exterior resin 7 by performing vacuum pressure impregnation of capacitor element 10 with a solution containing the polyhydroxy saturated hydrocarbon and/or phytic acid, which is followed by drying. Exterior resin 7 is formed by an ordinary method after this processing. When a heat load is applied after this processing, first an LC is rapidly increased similarly as in a situation without performing the processing, but the LC is restored over time and, after a lapse of 100 hours for a situation in which the polyhydroxy saturated hydrocarbon is added and 48–72 hours for a situation in which phytic acid is added, the LC is restored to a practical range. Application of a voltage further promotes this restoration and the LC is restored to an initial specification with application of a voltage for a few hours when either the polyhydroxy saturated hydrocarbon or phytic acid is added.

Though a mechanism of this LC restoration is not clearly known, inventors of the present invention have made a hypothesis as follows. That is, when capacitor element 10 includes the polyhydroxy saturated hydrocarbon, intramolecular or intermolecular dehydration of the polyhydroxy saturated hydrocarbon may occur when the heat is applied, and a small amount of water generated may be incorporated into a portion of dielectric coating 2 lacking oxygen to perform restoration even without a voltage application, and particularly when a voltage is applied, oxidation of an anode may occur due to electrolysis of the small amount of water, which may promote restoration of dielectric coating 2 to decrease the LC.

In addition, when capacitor element 10 includes phytic acid, a small amount of water absorbed on phytic acid may be incorporated into the portion of dielectric coating 2 lacking oxygen when the heat is applied to perform restoration even without a voltage application, and particularly when a voltage is applied, oxidation of the anode due to electrolysis of the small amount of water may be promoted with a phosphate group generated by hydrolysis of phytic acid with a portion of the small amount of water, which may promote restoration of dielectric coating 2 to decrease the LC.

Furthermore, when capacitor element 10 includes the polyhydroxy saturated hydrocarbon and phytic acid, restoration of dielectric coating 2 may further be enhanced with generation of water by heat dehydration of the polyhydroxy saturated hydrocarbon and the phosphate group generated by hydrolysis of phytic acid.

The inventors performed experiments described below as preliminary experiments for the present invention. Referring to FIG. 1, a sintered body including niobium as a main component was used as anode body 1, and dielectric coating 2 formed by oxidization of anode body 1, solid electrolyte layer 3 formed with a conductive polymer and cathode extraction layer 4 formed with conductive carbon, silver or the like were successively formed on a surface of anode body 1 to produce 40 of capacitor elements 10 for use in a capacitor of 100 µF/10 V. Thereafter, a heat application was performed at 245° C. for 5 seconds, which was followed by cooling for 1 hour at a room temperature in a normal humidity (about 20–25° C. and about 30–60% RH), and then LC values (initial LC values) were measured. As a test without a voltage load, respective 10 capacitor elements were placed in an environment of a room temperature and a normal humidity (about 20–25° C. and about 30–60% RH) and an environment of a high humidity (40° C. and 90% RH) for 24 hours, and then LC values (LC values after 24 hours) were measured. In addition, as a rated voltage application test, respective 10 capacitor elements were placed in an environment of a room temperature and a normal humidity (about 20–25° C. and about 30–60% RH) and in an environment of a high humidity (40° C. and 90% RH) with application of 10 V for 2 hours, and then LC values (LC values after 2 hours) were measured.

Table 1 shows results of the test without a voltage load, and table 2 shows results of the rated voltage application test.

TABLE 1

| Environmental Condition | Initial LC Value (µA) | LC Value (µA) After 24 Hours |
|---|---|---|
| Room Temperature and Normal Humidity | 7735 | 6412 |
| High Humidity | 7901 | 67 |

TABLE 2

| Environmental Condition | Initial LC Value (µA) | LC Value (µA) After 2 Hours |
|---|---|---|
| Room Temperature and Normal Humidity | 7507 | 3054 |
| High Humidity | 7305 | 27 |

As is seen from Tables 1 and 2, restoration of LC values largely differ in two environments, which indicates a fact that restoration of thermal degradation of the solid electrolytic capacitor mainly depends on a humidity. The present invention was made based on this fact.

First Embodiment

Referring to FIG. 1, a solid electrolytic capacitor according to one embodiment of the present invention has capacitor element 10 formed by successively forming dielectric coating 2, solid electrolyte layer 3 and cathode extraction layer 4 on a surface of anode body 1, and the capacitor element 10 further includes a polyhydroxy saturated hydrocarbon. The solid electrolytic capacitor of this embodiment is produced as follows. First, a dielectric coating 2 is formed by converting a surface of anode body 1 which is formed by molding and sintering powder including niobium as a main component with an anode lead member 11 formed with a niobium wire inserted thereto from one end surface thereof, and then solid electrolyte layer 3 formed with a conductive inorganic material such as manganese dioxide or a conductive organic material such as a TCNQ complex salt or a conductive polymer and cathode extraction layer 4 such as a carbon layer or a silver layer are successively formed on dielectric coating 2 to construct capacitor element 10. A solution of a polyhydroxy saturated hydrocarbon is prepared to immerse capacitor element 10 therein to perform vacuum pressure impregnation, which capacitor element 10 is then pulled out and dried. Thereafter, cathode extraction layer 4 of capacitor element 10 is fixed and electrically connected to a prescribed position of a cathode terminal 62 using a conductive adhesive 5, and anode lead member 11 is electrically connected to another prescribed position of an anode terminal 61 by welding or the like. These portions are set in a cavity of a mold to form exterior resin 7 by a well-known method of injecting an epoxy resin, an urethane resin or the like, and then the solid electrolytic capacitor in this embodiment is obtained.

Impregnation of capacitor element 10 with the polyhydroxy saturated hydrocarbon may be performed in a timing after formation of dielectric coating 2, after formation of solid electrolyte layer 3, or after connection of cathode extraction layer 4 to cathode terminal 62. Anode body 1 is not limited to a sintered body, and may be a foil laminated anode body.

Second Embodiment

Referring to FIG. 1, a solid electrolytic capacitor according to another embodiment of the present invention has capacitor element 10 formed by successively forming dielectric coating 2, solid electrolyte layer 3 and cathode extraction layer 4 on a surface of anode body 1, and the capacitor element 10 further includes phytic acid. The solid electrolytic capacitor of this embodiment is produced similarly as in the first embodiment except that a phytic acid solution is used in place of the solution of the polyhydroxy saturated hydrocarbon.

Impregnation of capacitor element 10 with phytic acid may be performed in a timing after formation of dielectric coating 2, after formation of solid electrolyte layer 3, or after connection of cathode extraction layer 4 to cathode terminal 62. Anode body 1 is not limited to a sintered body, and may be a foil laminated anode body.

Third Embodiment

Referring to FIG. 1, a solid electrolytic capacitor according to a further embodiment of the present invention has capacitor element 10 formed by successively forming dielectric coating 2, solid electrolyte layer 3 and cathode extraction layer 4 on a surface of anode body 1, and the capacitor element 10 further includes a polyhydroxy saturated hydrocarbon and phytic acid. The solid electrolytic capacitor of this embodiment is produced similarly as in the first embodiment except that a mixed solution of the polyhydroxy saturated hydrocarbon and phytic acid is used in place of the solution of the polyhydroxy saturated hydrocarbon.

Impregnation of capacitor element 10 with the polyhydroxy saturated hydrocarbon and phytic acid may be performed in a timing after formation of dielectric coating 2, after formation of solid electrolyte layer 3, or after connection of cathode extraction layer 4 to cathode terminal 62. Anode body 1 is not limited to a sintered body, and may be a foil laminated anode body.

The solid electrolytic capacitor according to the present invention will further be described in detail based on examples and comparative examples.

EXAMPLE 1

Referring to FIG. 1, anode body 1, which was formed by molding and sintering 60 mg of niobium powder having a CV product (a product of a capacity and a voltage, which is the same in the following) of 97,000 μFV/g with an inserted niobium wire to be anode lead member 11, was converted in a nitric acid solution at 45 V to form dielectric coating 2 on a surface of anode body 1, and then a polypyrrole polymer layer to be solid electrolyte layer 3, a carbon layer to be cathode extraction layer 4, and a silver layer were successively formed to construct capacitor element 10. Then, capacitor element 10 was immersed in a 2.5% lactitol solution, a pressure was decreased to 15 mmHg and then returned to an atmospheric pressure (760 mmHg), and 5 minutes later, capacitor element 10 was pulled out, washed with water, and then dried. Thereafter, cathode extraction layer 4 was adhesively fixed to cathode terminal 62 using a silver paste as conductive adhesive 5, anode lead member 11 was fixed to anode terminal 61 by resistance welding, and these portions were set in a cavity of a mold to perform injection molding with an epoxy resin to form exterior resin 7. Then, aging processing was performed by applying a voltage of 10 V at 110° C. for 1 hour to complete a solid electrolytic capacitor of 100 μF/10V. LC initial values were measured for 10 capacitors after application of 10 V at 25° C. Thereafter, a heat load with a peak of 245° C. for 5 seconds was applied using a reflow soldering machine (Malcom, SRS-1), which was followed by cooling at 25° C. for 2 hours, and then LC values after thermal degradation were measured. A voltage of 10 V was applied to 5 of the capacitors at 25° C. for 3 hours, and then LC values after the voltage application were measured. (Based on the JIS, the LC was measured as a value of 5 minutes, which is the same in the following examples and comparative examples.) The other 5 capacitors were placed in a normal humidity (about 30–60% RH) at 25° C. for 120 hours without any load, and LC values were then measured.

EXAMPLE 2

Processing similar to that in example 1 was performed except that a 5% sorbitol solution was used in place of the 2.5% lactitol solution of example 1.

EXAMPLE 3

Processing similar to that in example 1 was performed except that a 2% erythritol solution was used in place of the 2.5% lactitol solution of example 1.

EXAMPLE 4

Processing similar to that in example 1 was performed except that a 1% glucose solution was used in place of the 2.5% lactitol solution of example 1.

EXAMPLE 5

Processing similar to that in example 1 was performed except that a 0.5% lactose solution was used in place of the 2.5% lactitol solution of example 1.

EXAMPLE 6

Referring to FIG. 1, anode body 1, which was formed by molding and sintering 60 mg of niobium powder having the CV product of 97,000 μFV/g with an inserted niobium wire to be anode lead member 11, was converted in a nitric acid solution at 45 V to form dielectric coating 2 on a surface of anode body 1, and then a polypyrrole polymer layer to be solid electrolyte layer 3 and a carbon layer to be cathode extraction layer 4 were successively formed. Then, the resulting element was immersed in a 1% sorbitol solution, a pressure was decreased to 15 mmHg and then returned to an atmospheric pressure (760 mmHg), and 5 minutes later, the element was pulled out, washed with water, and then dried. Thereafter, a silver layer was formed on the carbon layer to construct capacitor element 10. A solid electrolytic capacitor was then completed similarly as in example 1

COMPARATIVE EXAMPLE 1

Processing similar to that in example 1 was performed except that pure water was used in place of the 2.5% lactitol solution of example 1.

COMPARATIVE EXAMPLE 2

Processing similar to that in example 1 was performed except that impregnation with the lactitol solution performed in example 1 was not performed.

Results of the examples are shown in Table 3.

TABLE 3

|  | Initial LC Value (μA) | LC Value (μA) After Thermal Degradation | LC Value (μA) After 3 Hours of Voltage Application | LC Value After 120 Hours Without Load |
| --- | --- | --- | --- | --- |
| Example 1 | 18 | 4801 | 60 | 70 |
| Example 2 | 13 | 3833 | 55 | 57 |
| Example 3 | 14 | 4766 | 75 | 81 |
| Example 4 | 27 | 4180 | 45 | 50 |
| Example 5 | 17 | 3701 | 110 | 91 |
| Example 6 | 21 | 4296 | 57 | 67 |
| Comparative Example 1 | 20 | 5196 | 2558 | 1294 |
| Comparative Example 2 | 29 | 5267 | 2863 | 1531 |

As shown in Table 3, according to the present invention, a markedly worsened LC with the heat application is decreased to 1/50–1/100 with the voltage application for only 3 hours. In contrast, in either of comparative example 1 (a blank test with water) and comparative example 2 (without impregnation), the LC was only decreased to about ½ with the voltage application for 3 hours. For reference purposes, an EIAJ (Electronic Industry Association of Japan, the same in the following) standard (RC-2378-101) for a leaked current for a solid electrolytic capacitor using tantalum as an anode body and a conductive polymer as a solid electrolyte layer, for example, is set to at most 100 μA. In view of this standard, it is indicated that the leaked current of the capacitor of 100 μF/10 V of the present invention used in each experiment falls within a practical range after the voltage application for 3 hours. In addition, though the capacitor of the present invention is restored to a level similar to that with the 3 hours of voltage application when it is left for 120 hours without a voltage load, the LC in each of comparative examples 1 and 2 is still at an mA level.

EXAMPLE 7

Referring to FIG. 1, anode body 1, which was formed by molding and sintering 60 mg of niobium powder having the CV product of 97,000 μFV/g with an inserted niobium wire to be anode lead member 11, was converted in a nitric acid solution at 45 V to form dielectric coating 2 on a surface of anode body 1, and then a polypyrrole polymer layer to be solid electrolyte layer 3, a carbon layer to be cathode extraction layer 4, and a silver layer were successively formed to construct capacitor element 10. Then, capacitor element 10 was immersed in a 5% phytic acid solution, a pressure was decreased to 15 mmHg and then returned to an atmospheric pressure (760 mmHg), and 5 minutes later, capacitor element 10 was pulled out, washed with water, and then dried. Thereafter, cathode extraction layer 4 was adhesively fixed to cathode terminal 62 using a silver paste as conductive adhesive 5, anode lead member 11 was fixed to anode terminal 61 by resistance welding, and these portions were set in a cavity of a mold to perform injection molding with an epoxy resin to form exterior resin 7. Then, aging processing was performed by applying a voltage of 10 V at 110° C. for 1 hour to complete a solid electrolytic capacitor of 100 μF/10V. LC initial values were measured for 10 capacitors after application of 10 V at 25° C. Thereafter, a heat load with a peak of 245° C. for 5 seconds was applied using the reflow soldering machine (Malcom, SRS-1), which was followed by cooling at 25° C. for 2 hours, and then LC values after thermal degradation were measured. A voltage of 10 V was applied to 5 of the capacitors at 25° C. for 2 hours, and then LC values after the voltage application were measured. The other 5 capacitors were placed in a normal humidity (about 30–60% RH) at 25° C. for 72 hours without any load, and LC values were then measured.

EXAMPLE 8

Processing similar to that in example 7 was performed except that a 2.5% phytic acid solution was used in place of the 5% phytic acid solution of example 7.

EXAMPLE 9

Processing similar to that in example 7 was performed except that a mixed solution of 2.5% of phytic acid and 1% of sorbitol was used in place of the 5% phytic acid solution of example 7.

EXAMPLE 10

Processing similar to that in example 7 was performed except that a mixed solution of 0.5% of phytic acid and 0.2% of sorbitol was used in place of the 5% phytic acid solution of example 7.

EXAMPLE 11

Processing similar to that in example 7 was performed except that a mixed solution of 1% of phytic acid and 3% of lactitol was used in place of the 5% phytic acid solution of example 7.

EXAMPLE 12

Processing similar to that in example 7 was performed except that a mixed solution of 1.5% of phytic acid and 0.5% of mannitol was used in place of the 5% phytic acid solution of example 7.

EXAMPLE 13

Processing similar to that in example 7 was performed except that a mixed solution of 2.5% of phytic acid and 1% of sodium gluconate was used in place of the 5% phytic acid solution of example 7.

EXAMPLE 14

Referring to FIG. 1, anode body 1, which was formed by molding and sintering 60 mg of niobium powder having the CV product of 97,000 µFV/g with an inserted niobium wire to be anode lead member 11, was converted in a nitric acid solution at 45 V to form dielectric coating 2 on a surface of anode body 1, and then a polypyrrole polymer layer to be solid electrolyte layer 3 and a carbon layer to be cathode extraction layer 4 were successively formed. Then, the resulting element was immersed in a 5% phytic acid solution, a pressure was decreased to 15 mmHg and then returned to an atmospheric pressure (760 mmHg), and 5 minutes later, the element was pulled out, washed with water, and then dried. Thereafter, a silver layer was formed on the carbon layer to construct capacitor element 10. A solid electrolytic capacitor was then completed similarly as in example 7.

COMPARATIVE EXAMPLE 3

Processing similar to that in example 7 was performed except that pure water was used in place of the 5% phytic acid solution of example 7.

COMPARATIVE EXAMPLE 4

Processing similar to that in example 7 was performed except that impregnation with the phytic acid solution performed in example 7 was not performed.

Results of the examples are shown in Table 4.

TABLE 4

|  | Initial LC Value (µA) | LC Value (µA After Thermal Degradation) | LC Value (µA) After 2 Hours of Voltage Application | LC Value After 72 Hours Without Load |
|---|---|---|---|---|
| Example 7 | 15 | 2690 | 120 | 132 |
| Example 8 | 13 | 2886 | 118 | 129 |
| Example 9 | 17 | 2784 | 55 | 64 |
| Example 10 | 20 | 2749 | 50 | 66 |
| Example 11 | 10 | 3285 | 70 | 70 |
| Example 12 | 14 | 2794 | 56 | 60 |
| Example 13 | 21 | 2579 | 80 | 97 |
| Example 14 | 18 | 2507 | 67 | 82 |
| Comparative Example 3 | 18 | 5410 | 3650 | 1849 |
| Comparative Example 4 | 15 | 5372 | 3785 | 2107 |

As shown in Table 4, according to the present invention, a markedly worsened LC with the heat application at an mA level is decreased to about 100 µA with the voltage application for only 2 hours. In contrast, in either of comparative example 3 (a blank test with water) and comparative example 4 (without impregnation), the LC was still at the mA level with the voltage application for 2 hours. For reference purposes, the EIAJ standard (RC-2378-101) for a leaked current for a solid electrolytic capacitor using tantalum as an anode body and a conductive polymer as a solid electrolyte layer, for example, is set to at most 100 µA. In view of this standard, it is indicated that the leaked current of the capacitor of 100 µF/10 V of the present invention used in each experiment falls within a practical range after the voltage application for 2 hours. In addition, though the capacitor of the present invention is restored to the same level as that with the 2 hours of voltage application when it is left for 72 hours without a voltage load, the LC in each of comparative examples 3 and 4 is still at an mA level and shows a large difference.

Though the conductive polymer was used as the solid electrolyte layer in each example, a similar effect can be obtained with a conductive inorganic material such as manganese dioxide or a conductive organic material such as a TCNQ complex salt.

In addition, the effect of improving the LC in the present invention can be obtained using an anode body which is a sintered body or foil formed with a valve action metal such as tantalum or aluminum. The effect of the present invention is especially large in the solid electrolytic capacitor using an anode body including niobium as a main component, which has a unique characteristic such that it is largely degraded with heat and a portion of oxygen atoms of a dielectric coating ($Nb_2O_5$) is diffused among niobium (Nb) of a base side to cause lack of oxygen in a dielectric. This is because, when the capacitor element includes the polyhydroxy saturated hydrocarbon, intramolecular or intermolecular dehydration of the polyhydroxy saturated hydrocarbon occurs in an oxygen-lacking portion and a small amount of water generated is effectively incorporated into the oxygen-lacking portion of the dielectric coating to perform restoration even without a voltage application, and particularly when a voltage is applied, oxidation of an anode occurs due to electrolysis of the small amount of water, which promotes restoration of the dielectric coating to rapidly decrease the LC. In addition, when the capacitor element includes phytic acid, oxidation of the anode due to electrolysis of water is effectively performed with a phosphate group generated by hydrolysis of phytic acid in the oxygen-lacking portion, which promotes restoration of the dielectric coating to rapidly decrease the LC.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor having a capacitor element formed by successively forming a dielectric coating, a solid electrolyte layer and a cathode extraction layer on a surface of an anode body,
    wherein said capacitor element includes a polyhydroxy saturated hydrocarbon in one of an intramolecular dehydration state and an intermolecular dehydration state.

2. The solid electrolytic capacitor according to claim 1, wherein said anode body includes niobium as a main component.

3. The solid electrolytic capacitor according to claim 1, wherein
    said polyhydroxy saturated hydrocarbon includes at least one member selected from the group consisting of a polyhydroxy aldehyde, a polyhydroxy ketone, a polyhydroxy alcohol, a polyhydroxy ether, a polyhydroxy acid and a salt thereof, and homologues, derivatives and polymers thereof.

4. The solid electrolytic capacitor according to claim 1, wherein
    said solid electrolyte layer is formed with a conductive organic material.

5. The solid electrolytic capacitor according to claim 4, wherein
    said conductive organic material is a conductive polymer.

6. A solid electrolytic capacitor having a capacitor element formed by successively forming a dielectric coating, a solid electrolyte layer and a cathode extraction layer on a surface of an anode body, wherein
    said capacitor element includes phytic acid in a hydrolyzable state.

7. The solid electrolytic capacitor according to claim 6, wherein said anode body includes niobium as a main component.

8. A solid electrolytic capacitor having a capacitor element formed by successively forming a dielectric coating, a solid electrolyte layer and a cathode extraction layer on a surface of an anode body, wherein
    said capacitor element includes a polyhydroxy saturated hydrocarbon and phytic acid.

9. The solid electrolytic capacitor according to claim 8, wherein
    said anode body includes niobium as a main component.

10. The solid electrolytic capacitor according to claim 8, wherein said polyhydroxy saturated hydrocarbon includes at least one member selected from the group consisting of a polyhydroxy aldehyde, a polyhydroxy ketone, a polyhydroxy alcohol, a polyhydroxy ether, a polyhydroxy acid and a salt thereof, and homologues, derivatives and polymers thereof.

* * * * *